United States Patent [19]
Lovett et al.

[11] Patent Number: 5,547,335
[45] Date of Patent: Aug. 20, 1996

[54] HANDLE ORIENTER FOR BUCKETS

[75] Inventors: David E. Lovett; Richard O'Brien, both of Indianapolis, Ind.

[73] Assignee: Webber Manufacturing Co., Inc., Indianapolis, Ind.

[21] Appl. No.: 517,840

[22] Filed: Aug. 22, 1995

[51] Int. Cl.$^6$ .................................................. B65G 59/10
[52] U.S. Cl. .................. 414/795.6; 221/238; 414/796.4; 414/786; 414/908
[58] Field of Search ........................... 221/238; 414/27, 414/795.6, 796.4, 798.9, 908, 786

[56] References Cited

U.S. PATENT DOCUMENTS

| | | | |
|---|---|---|---|
| 652,677 | 6/1900 | Kellington et al. | |
| 3,299,914 | 1/1967 | Harmon | 141/82 |
| 3,492,785 | 2/1970 | Mancini | 53/282 |
| 3,530,907 | 9/1970 | Slass | 141/167 |
| 4,372,102 | 2/1983 | McWilliams | 53/474 |
| 4,636,278 | 1/1987 | Wesley | 156/446 |
| 4,804,024 | 2/1989 | Arnemann | 141/165 |
| 4,953,600 | 9/1990 | Tribert et al. | 141/1 |
| 4,983,098 | 1/1991 | Heisler | 414/798.9 |
| 4,991,741 | 2/1991 | Anderson | 414/795.6 X |
| 5,042,540 | 8/1991 | Gorlich | 141/174 |

Primary Examiner—Karen B. Merritt
Assistant Examiner—Janice L. Krizek
Attorney, Agent, or Firm—Ice Miller Donadio & Ryan; Paul B. Overhauser; Doreen J. Gridley

[57] ABSTRACT

An apparatus and method for denesting and orienting a stack of handled receptacles. Each receptacle comprises a substantially open container having a base, an upper portion through which access to the open container is provided, and a pivotable handle connected to the upper portion. The orienter, which does not require that the receptacle have an open container, includes a support for holding the receptacle and a mechanism for retaining the pivotable handle of the receptacle. A mechanism is also provided for moving the receptacle off the support such that the receptacle hangs by its handle on the handle retainer. The orienter also includes a mechanism for releasing the handle from the handle retainer so that the receptacle is oriented in a predetermined position with respect to the apparatus. The denester of the present invention may be used to separate the first receptacle from a stack of receptacles so that each receptacle may be oriented by the orienter. The denester includes a mechanism for retaining all receptacles except the first receptacle on the support. The moving mechanism which moves the first receptacle off the support of the orienter of the present invention also serves as a mechanism to separate the first receptacle from the other receptacles in the stack. In this manner, each receptacle is oriented in the same orientation with respect to the apparatus for further processing, such as filling, lidding or labelling the receptacle.

18 Claims, 6 Drawing Sheets

HANDLE ORIENTER FOR BUCKETS

FIELD OF THE INVENTION

This invention relates to an apparatus for denesting and orienting receptacles such as buckets, and, in particular, to a machine for denesting stacked receptacles having a pivotable handle attached to the upper portion thereof, and orienting each denested receptacle in the same predetermined orientation with respect to the apparatus.

BACKGROUND OF THE INVENTION

All purpose receptacles, such as buckets, pails or cans, are used as containers for a variety of consumer goods, including solids and liquids. Generally, the receptacles are not manufactured by the provider of the goods. In fact, one entity may manufacture the receptacle, another may manufacture the goods to be contained within the receptacle, and a third may place the goods into the receptacles.

In some instances, it is desired that the receptacle be of the type including a handle to allow the consumer to easily transport the receptacle. Difficulty arises, however, in working with a receptacle having such a handle attached thereto in operations such as filling, lidding, and labelling the receptacle. If the handle is not properly oriented, it could interfere with the filling, lidding or labelling operations. Also, for lids having a fitting, such as an aperture therethrough or a pouring spout, it is desirable to place the fitting in a certain radial orientation with respect to the handle so that the consumer may pour the contents of the receptacle by holding the handle and base of the receptacle and tipping the receptacle. Further, it is desirable to place labels in the same orientation with respect to the handle for shelf display purposes, and to place directions or product warnings in plain view to the consumer. The importance of the orientation of a handled bucket for labelling purposes is illustrated in U.S. Pat. No. 4,636,278. Though this labeller is manually loaded, the operator must be certain to load the bucket in the proper orientation. Therefore, to accommodate further processing, it is desirable to provide a method for orienting handled receptacles prior to such processing.

It is common for open receptacles to be provided from the manufacturer in a stacked or nested orientation. When nested, the handles are also usually stacked and oriented in substantially the same direction. However, there is no assurance that the handle orientation will remain constant while stacked or when denested, either manually or automatically, as is described herein.

Often, it is not practical to remove a handle attached to the receptacle or to add a handle after the receptacle has been filled, lidded, and labeled. Such removal may be self-defeating as well, as there is no assurance that the receptacle is properly oriented with respect to machines used in future processing, such as lidding and labeling operations, if the handle is removed. Also, though the presence of the handle may be perceived as causing inconveniences, it may be beneficial in these processes, such as in guiding the receptacle through an automated machine, for example. Finally, removal and replacement of the handle results in increased costs associated with any of these processes by requiring additional resources and consuming additional time.

A variety of automatic machines are available for denesting stacked receptacles. In U.S. Pat. No. 3,299,914, for example, an apparatus is disclosed which denests stacked cups, as may be found in beverage dispensing machines, for example. The denesting apparatus of U.S. Pat. No. 3,299,914 includes an ejecting and separating means for denesting the cups and placing each individual onto a guide positioning the cup below the liquid dispenser discharge.

Another automatic beverage dispensing system having a denesting mechanism is disclosed in U.S. Pat. No. 3,530,907. In this invention, stacked cups are dropped from a cup dispenser by use of a mechanism comprising a motor and a cup-drop control. Each cup is placed on a conveyor belt for movement under a liquid dispenser for filling. Guides are provided on the conveyor belt to define the locations upon which the cups are to be dropped.

U.S. Pat. No. 5,042,540 discloses a food processing system in which trays residing on a conveyor belt are automatically filled with food. At the beginning of the operation, nested trays of a specific shape are denested by a conventional package or tray denester and placed in apertures in the conveyor belt. Because the apertures are complimentarily shaped for use with the trays, the trays remain in the same orientation throughout all operations in which the trays remain on the conveyor system.

An automatic cup filling and lidding apparatus is disclosed in U.S. Pat. No. 3,492,785. Prior to filling and lidding the cups, stacked cups are singularly denested into openings on a turntable. The turntable openings are designed to accommodate cups of a particular size and shape.

The aforementioned receptacle denesters illustrate that it is known in the art to provide a mechanism whereby individual receptacles can be separated and ejected from the remainder of the stack. However, none of these references specifically deal with a receptacle having a handle attached near the lip of the receptacle. Such a handle may interfere with the separating and ejecting mechanisms of these patents, in part because each ,denester drops the bottom receptacle in a vertically oriented stack onto a conveyor system. Therefore, it is desired to provide a denester which accommodates a receptacle having a handle attached thereto.

In view of receptacles having handles, the aforementioned denesters exhibit another shortcoming. Specifically, unless the receptacle is of a specific shape, the prior art denesters do not provide a means for orienting the receptacles in the same direction. As previously mentioned, in many subsequent operations such as filling, lidding and labelling, it is desired that all receptacles be in the same orientation with respect to the processing machine. The prior art denesters have depended on the shape of the receptacle coupled with the shape of guides or apertures on a conveyor belt or turntable to orient the receptacles. It is therefore desirable to provide a denester for use with handled receptacles which, when ejected, orients the receptacles in the same direction with respect to the handle, irrespective of the size or shape of the receptacle.

Yet another shortcoming of the denester systems is the utilization of a particularly configured conveyor means. A conveyor means specifically designed for a particular receptacle is more expensive to manufacture, repair and maintain. Also, because it is possible that future operations, such as filling, lidding and labelling, are accomplished with separate machines, the use of a unique conveyor system may require customization of the particular machine or may require transference of the receptacles from the unique conveyor system to another conveyor system. Use of a general purpose conveyor means will eliminate or reduce customization required of such a machine. Therefore, it is desirable to provide a denesting and orienting apparatus which places the denested, oriented receptacles on a general purpose conveyor means without precluding the use of a specialized conveyor means. Also, it is desirable to provide an apparatus for denesting and orienting handle receptacles which is inexpensive to manufacture, repair and maintain.

A method for radially orienting receptacles is disclosed in U.S. Pat. No. 4,804,024. Substantially closed receptacles, such as lidded barrels having an aperture in the lid, are radially oriented by rotating the barrel until the lid's aperture is detected to be in the proper position for filling of the barrel through the aperture. This invention does not address the problems specific to denesting and orienting a substantially open receptacle having a handle attached thereto. Because the receptacle may need to be oriented prior to having a lid thereon, such as is needed for labelling of the receptacle, it is therefore desirable to provide an apparatus and method for orienting substantially open containers.

One known system used to orient receptacles comprising an open container and having a pivotable handle attached to the upper portion thereof uses a mechanism similar to that of U.S. Pat. No. 4,804,024. Specifically, a receptacle is placed on a rotatable disk which rotates the receptacle until it is in the proper position. For this orienter, the receptacle is expected to have two radially opposed protrusions to which the pivotable handle is connected. Pins, or guides, are properly positioned above the disk for engagement of the receptacle's protrusions when the receptacle is in the proper radial orientation. Such a system is disadvantageous in that it is slow, orienting receptacles at a rate of only 6 to 12 receptacles a minute, for stacked receptacles must first be separated, then moved to the rotatable disk for orientation, and then moved off the rotatable disk for further processing of the receptacle. This system also interrupts conveyance of the receptacle such that if the receptacle has already been filled, the contents are apt to spill either during the interruption or during the spinning of the receptacle. The system is also limited in requiring that the receptacle have protrusions to identify the proper orientation of the receptacle. It is therefore desirable to provide an orienter which is fast,, efficient, and does not interrupt the conveyance of the receptacle. It is also desirable to provide an orienter which is capable of orienting handled receptacles without requiring that the receptacle have protrusions thereon.

Yet another orienter system uses a conveyor system comprising two adjacent V-belts, with one running V-belt running faster than the other. Placement of the receptacle on top of both V-belts causes the receptacle to rotate. A guide rail is properly positioned to guide the receptacle without further spinning thereof when the receptacle is in the proper orientation. Such an orienter is inefficient. The orienter may also stress the receptacle when not permitted to rotate as the varying speed V-belts continue to rotate under the receptacle when the receptacle's radial motion is stopped. Similarly, the previously discussed orienter also places orienting forces on the receptacle after the receptacle is oriented as the rotatable disk continues to rotate under the receptacle after it is oriented. Though the V-belts or rotatable disk may be comprised of materials over which the receptacle may slide when its rotation is stopped, such sliding may mark or scratch the receptacle. Therefore, it is desired to provide an orienter which does not utilize an expensive conveyor system and which does not stress or damage the receptacle by continuing to apply an orienting force after the receptacle is already oriented.

Another shortcoming present in prior art denesting and orienting systems is the inability to orient subsequent conveying systems onto which the oriented receptacles are placed in any angle in relation to the denester/orienter machine. In many instances, the path of conveyance away from the denester/orienter must be a continuation of the major axis of the denester machine. Such a limitation results in the consumption of invaluable floorspace and may preclude the use of the machine in certain facilities. Therefore, it is desirable to provide a denester/orienter capable of placement of the oriented buckets onto a conveyor system which does not necessarily have its path of conveyance in line with the denester/orienter.

Finally, it is important to provide a denester/orienter which does not harm the receptacle during the denesting and orienting procedures. Many receptacles have preprinted labels, marks, or information printed thereon, and scratching of the receptacle surface or deformation or disfiguration of the receptacle results in a scrap receptacle and therefore increases costs associated with the handling of such receptacles.

OBJECTS OF THE INVENTION

Accordingly, it is one object of the present invention to provide an apparatus and method for denesting receptacles having a handle attached to the upper portion thereof.

It is another object of the invention to provide an apparatus and method for denesting such receptacles and placing each receptacle on a conveying means in a constant radial orientation with regard to the handle and a predetermined position with respect to the apparatus.

It is still another object of the present invention to provide an orienting method and apparatus which operates independent of the shape of the receptacle and which does not require that the receptacle include protrusions onto which the pivotable handle is connected.

It is yet another object of the invention to provide an orienting method and apparatus which places the receptacles on a general purpose conveyor means rather than a conveyor means tailored to accommodate a particular size or shape of receptacle.

It is another object of the present invention to provide a denesting and orienting apparatus which is efficient, capable of orienting receptacles with relative expediency, and inexpensive to manufacture, repair and maintain.

It is still another object of the present invention to provide an orienter which does not continue to apply orienting forces on the receptacle after the receptacle is properly oriented.

It is yet another object of the present invention to provide a denesting and orienting apparatus which is capable of placing oriented receptacles onto a conveyor system which is not required to be oriented in any particular direction with respect to the apparatus, thereby providing greater flexibility in the use of the apparatus in a variety of facilities.

It is another object of the present invention to provide a denesting and orienting apparatus that does not scratch, deform, or disfigure the receptacle during the denesting and orienting procedures so that the apparatus may be used with preprinted receptacles.

SUMMARY OF THE INVENTION

The present invention provides an apparatus and method for orienting receptacles, such as buckets, having a handle so that each receptacle may be filled, lidded, labelled, and the like with the handles of each receptacle in the same direction. The present invention also provides a denester for separating stacked receptacles to work in conjunction with the orienter of the present invention to thereby automate the denesting and orienting procedures for stacks of handled receptacles.

The orienter of the present invention includes a first support for supporting the receptacle, and a pivotable handle retaining means. The orienter also includes a means for moving the receptacle off the first support such that the receptacle hangs by its handle from the handle retaining; means. Further, the orienter includes a means for releasing the handle from the handle retaining means such that the receptacle is oriented on a second support means in a predetermined position with respect to the orienter.

One embodiment of the orienter of the present invention requires that the handled receptacle be supported horizontally on a support having an end such that the handle of the receptacle is beyond the end of the support and hangs below the bucket, referred to as the "ready position." The orienter also includes a means for receiving the handle of the receptacle. The handle receiving means is rotatable about a substantially horizontal axis which is also perpendicular to the horizontal axis of the support. A stop means is provided for stopping rotation of the receptacle in a substantially upright position. To orient a receptacle in the ready position, the receptacle is horizontally moved in a direction away from the support to cause the receptacle's handle to engage the handle receiving means and to cause the receptacle to begin to rotate about its handle until the receptacle contacts the stop means to rest in a substantially upright position. The handle receiving means is rotated away from the support, releasing the receptacle's handle from the handle receiving means such that the handle is substantially upright.

In another embodiment, the orienter also includes a platform onto which the receptacle is released by the handle receiving means. In yet another embodiment, the orienter includes a means for pushing the upright, oriented receptacle onto an adjoining conveyor means such that the receptacle may be transported to another machine, such as one used for filling, lidding or labelling the receptacle.

The denester of the present invention is capable of separating a top or first receptacle from the remainder of the stack of receptacles to place the first receptacle in the ready position so that the receptacle may be oriented by the orienter of the present invention. The denester of the present invention includes a means for supporting stacked (nested) receptacles. The denester also includes a means for retaining all but the first receptacle on the support means such that the first receptacle may be separated from the remainder of the stack. The means for moving the first receptacle of the denester causes separation of the first receptacle from its nested position. When used with the orienter of the present invention, the moving means of the denester is also used to move the first receptacle off the support means so that the first receptacle hangs from the handle retaining means of the orienter.

One embodiment of the denester includes a means for supporting the stacked receptacles in a horizontal position and a means for conveying the receptacles along the horizontal axis of the support means. The denester also includes a means for retaining at one end of the support means all the receptacles from further conveyance by the conveyor means, and a means for separating the first receptacle from the remainder of the stack such that the first receptacle extends partially beyond the end of the support means with the first receptacle's handle suspended beyond the end of the support means and substantially below the first receptacle (the "ready position").

A cradle system may optionally be used to feed the conveyor system of the denester. In this manner, stacks of receptacles may be automatically loaded onto the conveyor. Thus, loading, denesting, orienting and unloading of the receptacles may be fully automated.

The orienter of the present invention is desirable in that it is capable of orienting handled receptacles in a constant, predetermined position with respect to the orienter. The orienter may be used with any shape receptacle so long as the receptacle has a pivotable handle attached to the upper portion of the receptacle. The orienter may also work in conjunction with a denester to denest (separate) a stack of open-container type receptacles, such as buckets, paint cans, and the like. A conventional conveyor means or one attached to service another machine, such as a filler, lidder, or labeller, may be placed adjacent and serviced by the orienter of the present invention. Further, both the orienter and the denester are comprised of inexpensive, reliable, low maintenance components to result in apparati which are themselves inexpensive to manufacture, repair and maintain.

The methods for orienting and for denesting handled receptacles are comprised of few steps resulting in an efficient system which is inexpensive to manufacture, repair, and maintain. To orient a receptacle, a first support means is provided and a receptacle is placed on the first support means. Then, the handle of the receptacle is engaged and the receptacle is moved in a direction toward the engaged handle until the receptacle hangs by its handle. Then, the handle is released such that the receptacle is oriented on a second support means, such as a platform, in a predetermined position with respect to the first support means.

For both denesting and orienting a stack of receptacles, the receptacles are placed on the first support means. All but the first receptacle are retained on the first support means and the handle of the first receptacle is engaged. The first receptacle is moved toward its engaged handle and away from the other receptacles and the first support means to separate (denest) the first receptacle from the stack and to cause the first receptacle to hang by its handle. Finally, the handle is released, placing the receptacle on a second support means in a predetermined position with respect to the first support means.

DETAILED DESCRIPTION

Figure 1:
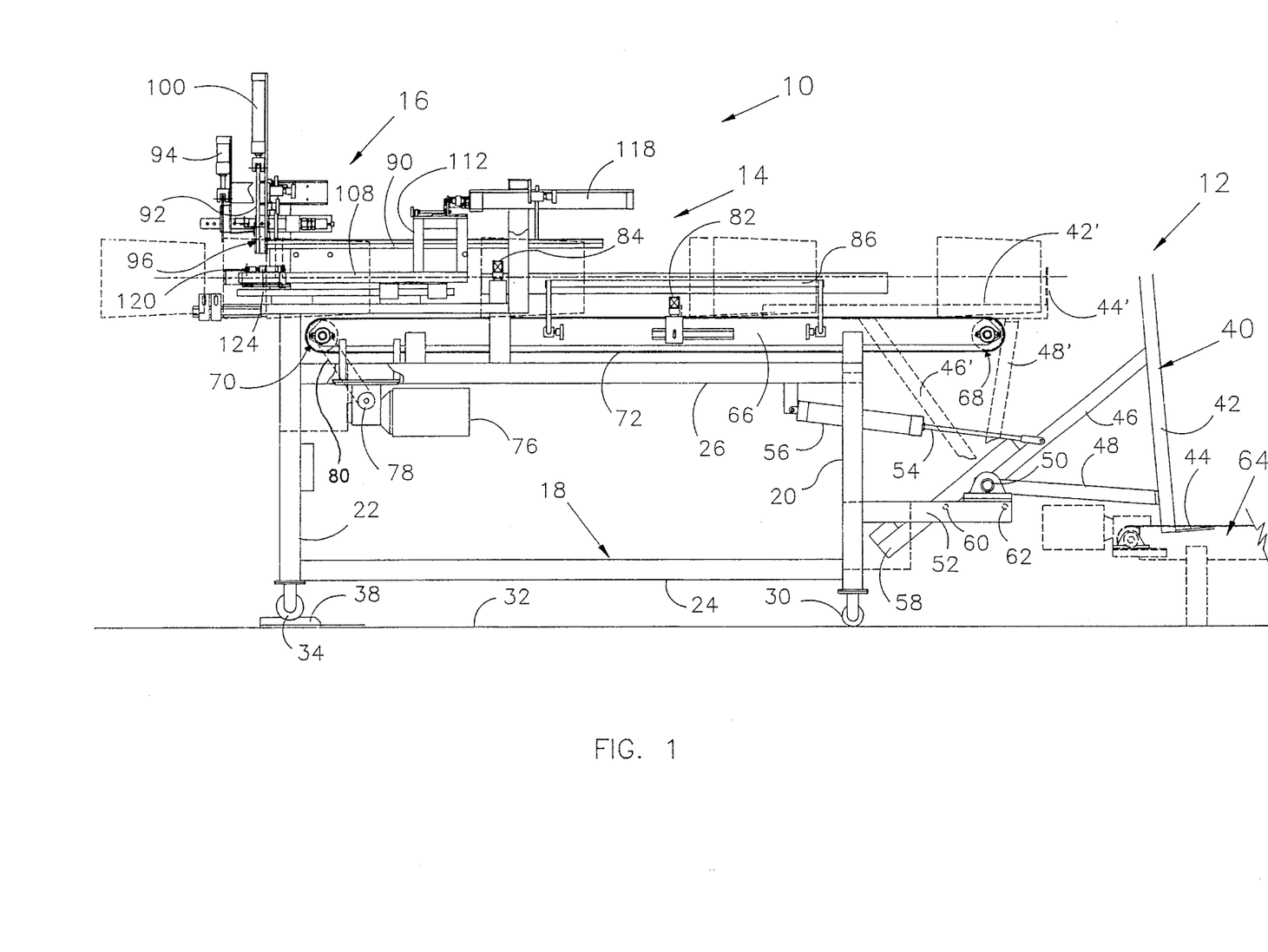
FIG. 1 shows a side view of one embodiment of the receptacle feeder according to the present invention.

Referring now to the drawings, and particularly to FIG. 1, there is shown one embodiment of the pail feeder according to the present invention. Feeder 10 is to denest stacked receptacles, such as buckets, pails, or cans, and may be used in conjunction with receptacle orienter 150 shown in FIGS. 4–6, to orient the denested receptacles onto an adjoining conveyor belt. The denested receptacles are oriented in the same predetermined position with respect to the feeder 10 and orienter 150 when placed onto an adjoining conveyor belt, as is discussed in further detail herein.

Feeder 10 of the embodiment of FIG. 1 comprises three major sub-systems. Specifically, feeder 10 includes stack inverter 12, conveyor system 14, and receptacle separating system 16. In general, stack inverter 12 is used to elevate a stack of nested receptacles onto conveyor system 14. Conveyor system 14 moves receptacles toward receptacle separating system 16. Receptacle separating system 16 separates the first or top receptacle of the stacked group of receptacles from the remaining receptacles so that the first receptacle may be oriented by orienter 150 shown in FIGS. 4–6.

Figure 3:
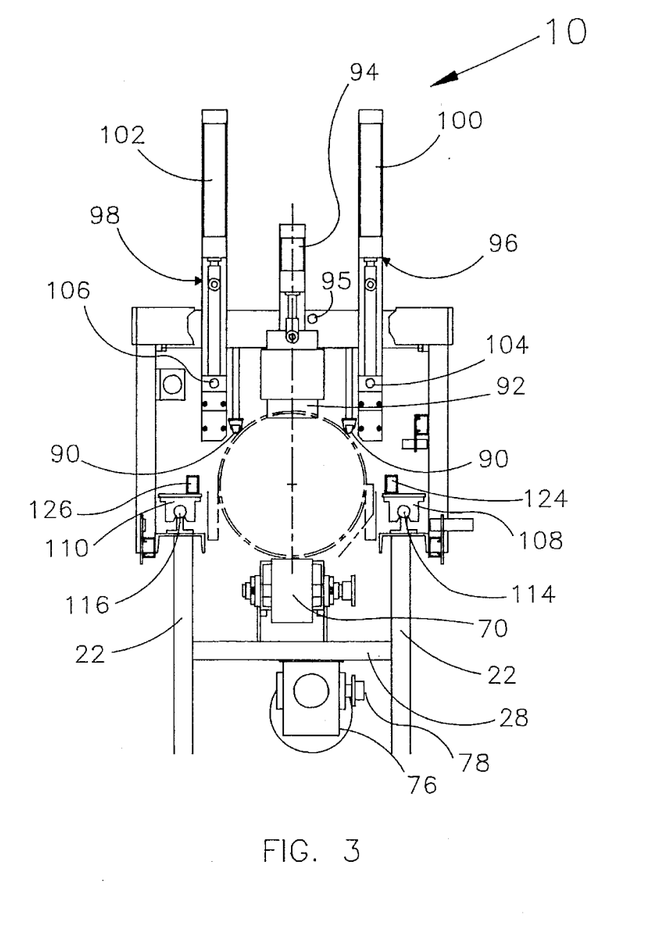
FIG. 3 shows an end view of the feeder of FIG. 1.

In this embodiment, stack inverter 12, conveyor system 14, and receptacle separating system 16 are connected to frame 18. Frame 18 comprises a pair of rear legs 20, a pair of front legs 22, a pair of bottom cross bars 24 joining one each of the rear legs 20 and front legs 22, and a pair of top cross bars 26 joining one each of rear legs 20 and front legs 22. Only one each of the rear legs 20, front legs 22, bottom cross bars 24, and top cross bars 26 are visible in FIG. 1 with the other legs and cross bar being substantially identical and joined to the legs and cross bars shown in FIG. 1 by side bars (not shown)—one side bar joining rear legs 20 and another side bar joining front legs 22. One such side bar 28 is illustrated in FIG. 3.

Operably connected to the rear of feeder 10 is stack inverter 12 for elevation of a stack of nested receptacles onto conveyor system 14 of feeder 10. In this embodiment, stack inverter 12 includes cradle 40 having elongated support 42 and foot 44 for receipt of a stack of nested receptacles such that the base of the bottom receptacle rests on foot 44 of cradle 40. Cradle 40 is supported by first and second cradle braces 46 and 48, which are each rigidly attached to cradle support 42 at one end, and which are pivotally connected to cradle shaft 50 at the other ends of cradle braces 46 and 48. Cradle shaft 50 is connected by frame extension 52 to rear leg 20 of feeder 10. First cradle brace 46 is also pivotally connected to rod 54 of cradle pneumatically activated cylinder 56. Pneumatic cylinder 56 is pivotally connected to frame 18 of feeder 10. Counterweight 58 is also attached to first cradle brace 46. First and second proximity switches 60 and 62 are attached to frame extension 52.

Stack inverter 12 is movable between a ready ;position as illustrated in FIG. 1, in which cradle 40 is positioned to receive a stack of nested receptacles, and a load position illustrated in FIG. 1 as the alternate cradle elements 42', 44', 46', and 48'. When in the ready position, rod 54 of pneumatic cylinder 56 is extended, counterweight 58 has tripped first proximity switch 60, and cradle support 42 is substantially vertical. A stack of nested receptacles is placed on cradle 40 such that the base of the bottom receptacle rests on foot 44 and the handles of all receptacles face cradle support 42. To raise the stack of nested receptacles to the conveyor load position, pneumatic cylinder 56 is activated to retract cylinder rod 54. Retraction of rod 54 assisted by the presence of counterweight 58 causes rotation of cradle 40 about cradle shaft 50. Second proximity switch 62 is provided in this embodiment to indicate that cradle 40 is in the load position, and is tripped by the rotation of counterweight 58 about shaft 50. When in the load position, the stack of receptacles lie on their side with the handles facing downward and, therefore, are prepared to be conveyed by conveyor system 14 for denesting by separator system 16.

It will be appreciated by those of skill in the art that stack inverter 12 is not essential to the invention. Rather, an operator may simply place stacked receptacles onto conveyor system 14. However, use of stack inverter 12 results in easier placement of receptacles onto the higher positioned conveyor system 14.

Also, because a stack inverter 12 receives receptacles with the handles forward and the handle grips aligned, stack inverter 12 places the oriented stack of receptacles onto conveyor system 14 with the handles downward. By conveying the stack with the handles down, the flat surface of the handle grip rests on the flat conveyor surface, thereby stabilizing the stack of receptacles as they are denested by denester 16. As described in further detail herein, denester 16 is a reciprocating system. Therefore, if the handle grips were not resting against the flat conveyor surface, the, stack would be forced to rotate about the longitudinal axis of the stack (an axis substantially parallel to the conveyor system path). Such rotation would detract from the effectiveness of the present invention.

Further, it will be appreciated that it is conceivable that a separate conveyor system, such as preparatory conveyor system 64 of FIG. 1, could be used to move a stack of nested receptacles onto stack inverter 12, thereby further automating the procedures associated with processing the receptacles. For example, preparatory conveyor system 64 may transport stacked receptacles from a loading dock.

Figure 2:
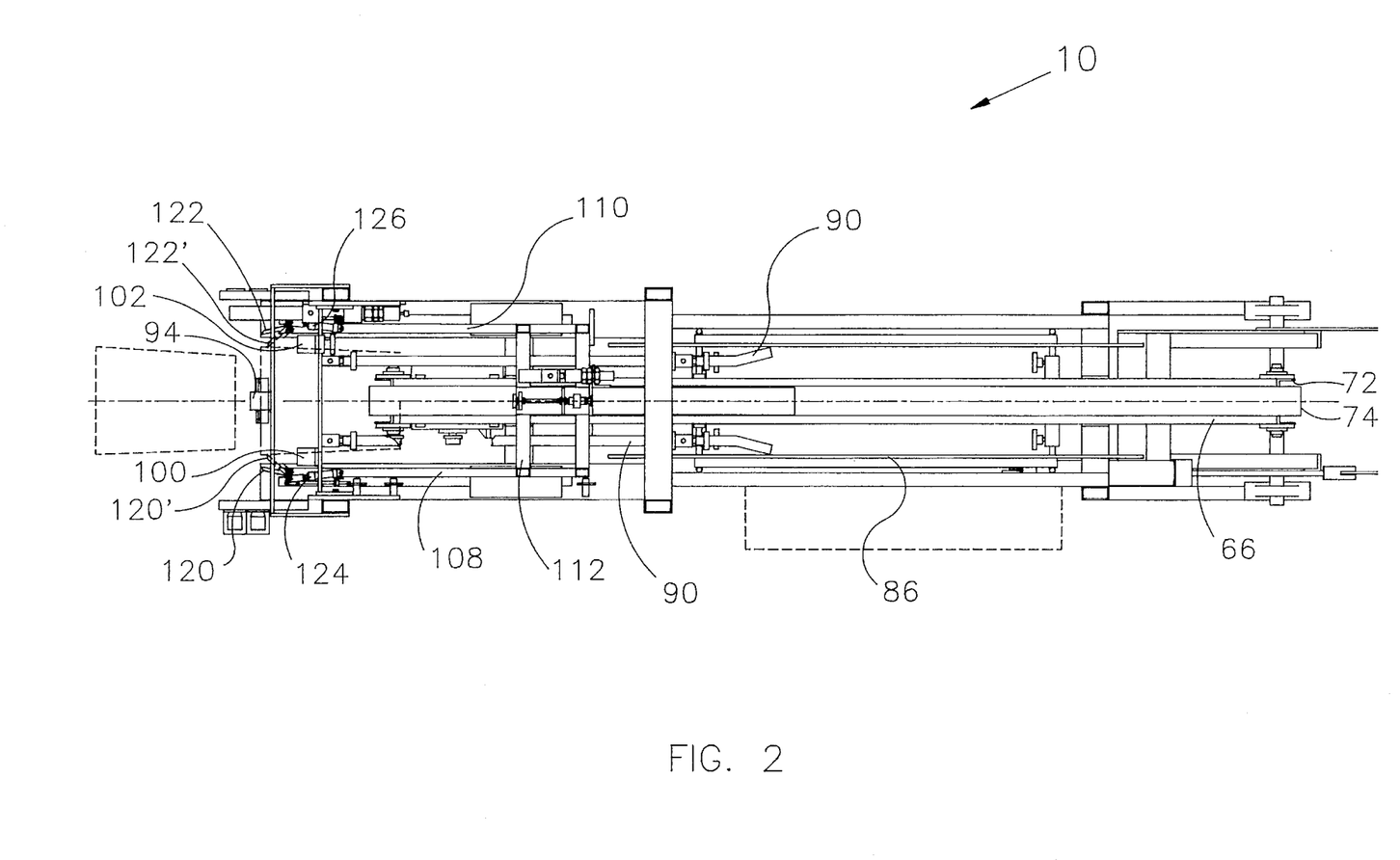
FIG. 2 shows a top view of the embodiment of the feeder of FIG. 1.

Turning now to conveyor system 14 as shown in FIGS. 1–2, conveyor system 14 includes conveyor frame 66 (best illustrated in FIG. 2) which is rigidly affixed to feeder frame 18. Rotatably attached to the rear and front ends of conveyor frame 66 are first and second conveyor sprockets 68 and 70, respectively. First and second conveyor sprockets 68 and 70 (see FIG. 1) are connected to each other via conveyor chain 74 such that first and second conveyor sprockets synchronously rotate. Disposed about sprockets 68 and 70 is conveyor chain 74. Conveyor chain 74 is comprised of plastic links, which resist stretching. The material of conveyor chain 74 must also be one which, when engaging receptacles, causes the receptacles to move in concert with the conveyor belt, but which, if the receptacles are stopped from moving with conveyor belt 74 does not cause conveyor chain 74 to stop moving or to bind or place undue forces on the other elements of conveyor system 14.

In this embodiment, first sprocket 68 is permitted to freely spin about its axis of rotation. Second sprocket 70 is operatively connected to conveyor motor 76 so that second sprocket 70 is caused to move by activation of conveyor motor 76. Specifically, activation of conveyor motor 76, a one-half horsepower motor in this embodiment, causes rotation of motor sprocket 78. Because motor sprocket 78 is connected to second sprocket 70 by motor chain 80, rotation of motor sprocket 78 causes rotation of second sprocket 70, which in turn, through conveyor chain 74, causes first conveyor sprocket 68 to rotate. Rotation of second sprocket 70 in a counterclockwise direction, as viewed in FIG. 1, causes conveyor chain 74 to move to advance receptacles contacting chain 74 from the rear of feeder 10 toward receptacle separating system 16. Conveyor system 14 further comprises first and second photosensors 82 and 84 capable of sensing the passage of a receptacle past the sensor on conveyor chain 74.

To provide additional support for receptacles being transported on conveyor belt 74, conveyor system 14 further includes side rails 86. Side rails 86 prevent rolling of receptacles in a direction perpendicular to the conveyor chain 74 movements.

Receptacle separating system 16 (separator 16) is illustrated in FIGS. 1–3. As explained in further detail herein, separator 16 comprises four pneumatically actuated subsystems for separation of the first receptacle from the remainder of the stack. While in the process of being denested by separator 16, receptacles are supported by conveyor chain 74 and top rails 90. As previously described, conveyor system 14 advances buckets from its rear end from optional stack inverter 12 toward separator 16 as illustrated in FIG. 1.

It will be appreciated that a mechanism for stopping conveyance of receptacles beyond the front end of conveyor system 14 is necessary in order to permit the separation of the first receptacle from the remainder of the stack. In this embodiment, conveyance of the entire stack of receptacles is stopped by the extension of pneumatically actuated stop plate 92 as illustrated in FIGS. 1 and 3. Stop plate 92 is positioned above conveyor chain 74, is movable between an extended position and a retracted position, and is actuated by pneumatic cylinder 94. Specifically, when stop plate 92 is extended downward toward conveyor chain 74 by pneumatic cylinder 94, the lower edge of stop plate 92 contacts the upper lip of a first receptacle being conveyed by conveyor system 14 to stop conveyance of the first receptacle and any other receptacle or stack of receptacles into which the first receptacle is nested. When retracted, stop plate 92 is raised to permit passage of a receptacle thereby, i.e., to permit further conveyance of all receptacles residing on conveyor system 14. Proximity switch 95 is strategically placed as shown in FIG. 3 to provide an indication of the position of stop plate 92. When proximity switch 95 is activated, stop plate 92 is in its retracted, or raised, position. Thus, the first pneumatic subsystem of separator 16 comprises stop plate 92 and pneumatic cylinder 94. The operation of this first pneumatic subsystem in coordinated operation with the remaining subsystems is described in further detail herein.

The second pneumatically actuated subsystem of separator 16 includes first and second side bars 96 and 98 which are moved between extended and retracted positions by first and second side bar pneumatic cylinders 100 and 102, respectively (See FIGS. 1–3). When pneumatic cylinders 100 and 102 are retracted, stop side bars 96 and 98 are retracted (as shown in FIGS. 1 and 3) and do not interfere with the conveyance of receptacles by conveyor system. When side bars 96 and 98 are extended, further conveyance of receptacles positioned to the right (in the rear of) of side bars 96 and 98 are prohibited from being conveyed by conveyor system 14 as side bars 96 and 98 contact the upper lip of the receptacle.

Specifically, side bars 96 and 98 are spaced from each other and from stop plate 92 to hold in place (i.e. stop conveyance of) the second receptacle of a stack of receptacles when stop plate 92 is contacting the upper lip of the first or top receptacle. Side bars 96 and 98 fall on either side of the first receptacle but are sufficiently proximate the outside surface of the first receptacle to stop further conveyance of the second receptacle when the upper lip of the second receptacle contacts side bars 96 and 98. Alternatively, if the receptacles are formed having a trough around the outside of the receptacle below the upper lip of the receptacle, side bars 96 and 98 :may be spaced from stop plate 92 and from each other to slide into the trough of the second receptacle when the first receptacle is contacting stop plate 92.

Proximity switches 104 and 106 are positioned proximate first and second side bars 96, and 98, respectively, to provide an indication of when first and second side bars 96 and 98 are in the extended position, as shown in FIG. 3. Activation of proximity switches 104 and 106 indicate that side bars 96 and 98, respectively, are fully extended. The first and second pneumatic subsystems of denester 14 described immediately above are capable of ceasing further conveyance of the first and second receptacles. The third and fourth pneumatic subsystems work in cooperation to separate the first receptacle from the second receptacle. It is therefore helpful at this point to describe the operation of the first and second pneumatic subsystems of separator 16.

As a stack of receptacles are conveyed from the rear of feeder 10 to the front of feeder 10 toward separator 16, photoelectric sensors 82 and 84 detect the passage of receptacles thereby. If either sensor 84 or sensor 82 detects the presence of one or more receptacles on conveyor system 14, stop means pneumatic cylinder 94 is actuated to cause stop plate 92 to lower to its extended position. Also, if not already retracted, first and second side bar pneumatic cylinders 100 and 102 are actuated to cause side bars 96 and 98 to move to their retracted, or raised, position. Receptacles are continued to be conveyed by conveyor system 14 into separator system 16, where receptacles are guided by top rails 90. Once the top or first receptacle engages stop plate 92, the first receptacle remains stationary while conveyor belt 74 continues to move. If, at this point, stop plate 92 remains in its extended position, a dam has been created to eventually cease further conveyance of all receptacles being conveyed by conveyor system 14. Such damming of conveyor system 14 may be desired when the system is initially loaded with stacks of receptacles, but is not necessary to be maintained throughout the operation of feeder. In the embodiment described herein, stop plate 92 is not left in its extended position, but rather cycles between its extended and retracted positions every time a receptacle is denested.

If stop plate 92 has stopped conveyance of two or more receptacles, constituting a stack of receptacles, once the first receptacle contacts stop plate 92, the second receptacle should be in position to be held by the second pneumatic subsystem, namely side bars 96 and 98, of separator 16. Thus, at this point, first and second side bar pneumatic cylinders 100 and 102 are actuated to cause side bars 96 and 98, respectively, to move to their extended, or lowered, position in which side bars 96 and 98 engage the upper lip (or a trough near the upper lip) of the second receptacle to ensure no further conveyance of the second receptacle, even if the first receptacle is removed from the stack of receptacles. Because the first receptacle is nested, stop plate 92 may be retracted at this point without resulting in movement (conveyance) of the first, second, or any other receptacle in the stack including the held second receptacle.

Once the second receptacle is held in place by the second pneumatic subsystem and stop plate 92 has been retracted to the raised position, the third and fourth pneumatic subsystems operate to denest the first receptacle from the second receptacle (and, hence, the remainder of the stack). As used herein and in the claims, the top or first receptacle is in a "ready" position when suspended over the front end of conveyor 14 and held in place by the fact that it is nested inside the second receptacle which is, in turn, held stationary with respect to conveyor system 14. Also, when in the ready position, the handle of the receptacle extends beyond the end of the support means, which in this embodiment is the combination of separator 16 and conveyor system 14, and is suspended below the receptacle.

The third pneumatic subsystem of denester 16 comprises first and second pusher bars 108 and 110 which, in this embodiment:, are connected to each other by pusher bar frame 112. First pusher bar 108 is slidably mounted on first rod 114, and second pusher bar 110 is slidably mounted on second rod 116. Both first and second rods 114 and 116 are positioned such that their longitudinal axes are parallel with the receptacle travel path, i.e., the axis defined by conveyor belt 74. In this manner, the entire apparatus comprising pusher bars 108 and 110 and pusher bar frame 112 may be moved along and against the receptacle travel path.

The third pneumatic subsystem of denester 16 also includes pusher pneumatic cylinder 118 which is operably connected to pusher bar frame 112 to pneumatically move pusher bars 108 and 110 from a retracted position in which the forward end of pusher bars 108 and 110 reside in substantially the plane of stop plate 92, and an extended position in which the receiver ends of pusher bars 108 and 110 extend forward beyond the plane defined by stop plate 92.

Finally, the fourth pneumatic subsystem of separator 16 serves as a means for engaging the upper portion or upper lip of the first receptacle when the first receptacle is in its ready position. The fourth pneumatic system is affixed to pusher bars 108 and 110 such that once the fourth pneumatic subsystem engages the first receptacle, pusher bars 108 and 110 may be moved forward to separate the first receptacle from the second receptacle or the remainder of the stack.

As seen in FIG. 2, the fourth pneumatic subsystem comprises first and second fingers 120 and 122, and first and second finger-actuating pneumatic cylinders 124 and 126, all of which are mounted on pusher bars 108 and 110 as shown in FIGS. 1–3. First finger 120 is pivotally connected to first finger-actuating pneumatic cylinder 124 such that when first finger-actuating pneumatic cylinder 124 is retracted, first finger 120 is in its retracted, or nonengaging position, and when first finger-actuating pneumatic cylinder 124 is extended, first finger 120 is caused to pivot into its receptacle engaging position designated as 120' in FIG. 2. Similarly and symmetrically, second finger 122 is pivotally connected to second finger-actuating pneumatic cylinder 126 such that second finger 122 is movable between a retracted, or non-engaging position, shown as 122 in FIG. 2, and an engaging position, shown as 122' in FIG. 2.

Considering the operation of the third and fourth pneumatic subsystems of separator 16, once the first receptacle is in the ready position previously described in association with the first and second pneumatic subsystems of separator 16, pusher bars 108 and 110 and fingers 120 and 122 are in their retracted positions. Fingers 120 and 122 are then pivoted to their respective receptacle engaging position by extending the finger-actuating pneumatic cylinders 124 and 126. Once fingers 120 and 122 are in their extended, receptacle-engaging positions, designated as 120' and 122' in FIG. 2, pneumatic cylinder 118 is actuated to extend pusher bars 108 and 110 to their extended positions. The forward movement of pusher bars; 108 and 110 causes the first receptacle to be moved forward. At some point during the forward movement of the first receptacle, the first receptacle is no longer supported by feeder 10, and, if a second receptacle is held in place by side bars 96 and 98, the first receptacle is denested from the second receptacle with the second receptacle providing no support for the first receptacle. At this point, if fingers 120 and 122 are caused to retract to their non-engaging positions, the first receptacle would fall, due to the force of gravity, from feeder 10 to floor 32 below. Of course, dropping the receptacle may be of little operational application, and therefore, feeder 10 is intended for use with another apparatus positioned proximate the forward end of feeder 10. Orienter 150, shown in FIGS. 4–6, is such an apparatus.

It will be appreciated by those of skill in the art that the pneumatic subsystems of separator 16 need not be specifically oriented as shown in the embodiment of FIGS. 1–3. For example, stop plate 92 could be caused to move horizontally rather than vertically to accomplish the same function. However, because gravity plays a part in orienting the receptacles as described below in association with FIGS. 4–6, if the orienter of the present invention is to be utilized, care must be taken to avoid interference with the moving parts of the orienting apparatus.

It will also be appreciated that a first receptacle will be advanced off the forward end of separator 16 of feeder 10 regardless of whether the first receptacle is the first in a stack of receptacles, i.e., regardless of whether one or more receptacles are held in place by side bars 96 and 98. When used with another apparatus, such as the orienter of FIGS. 4–6, the ability to advance a single receptacle is beneficial as a single receptacle may be oriented as described herein. Further, feeder 10 will operate without requiring that there be a continuous stack of receptacles, and, of course, will operate on the last receptacle in a stack of receptacles.

Figure 4:
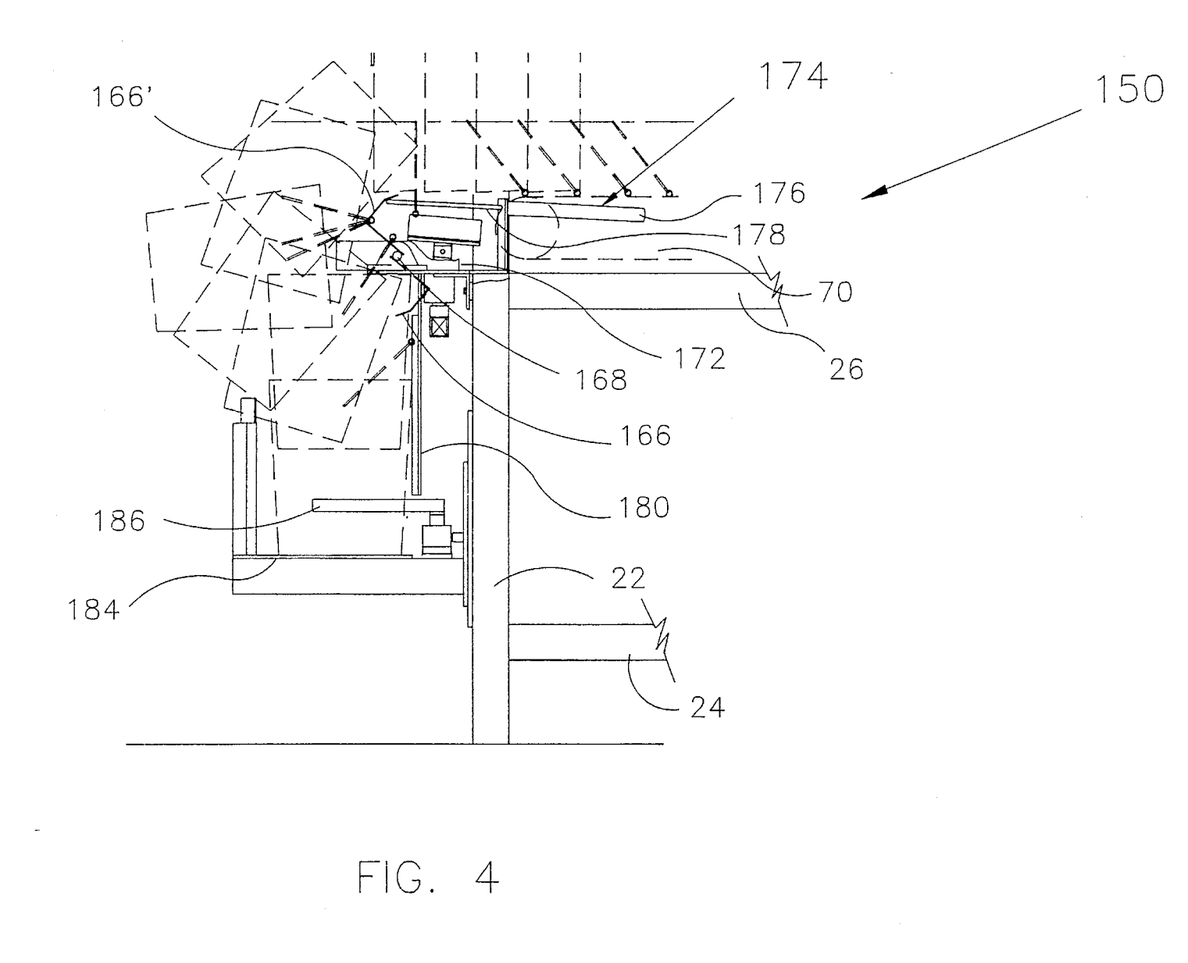
FIG. 4 shows a side view of one embodiment of the receptacle orienter of the present invention.
Figure 5:
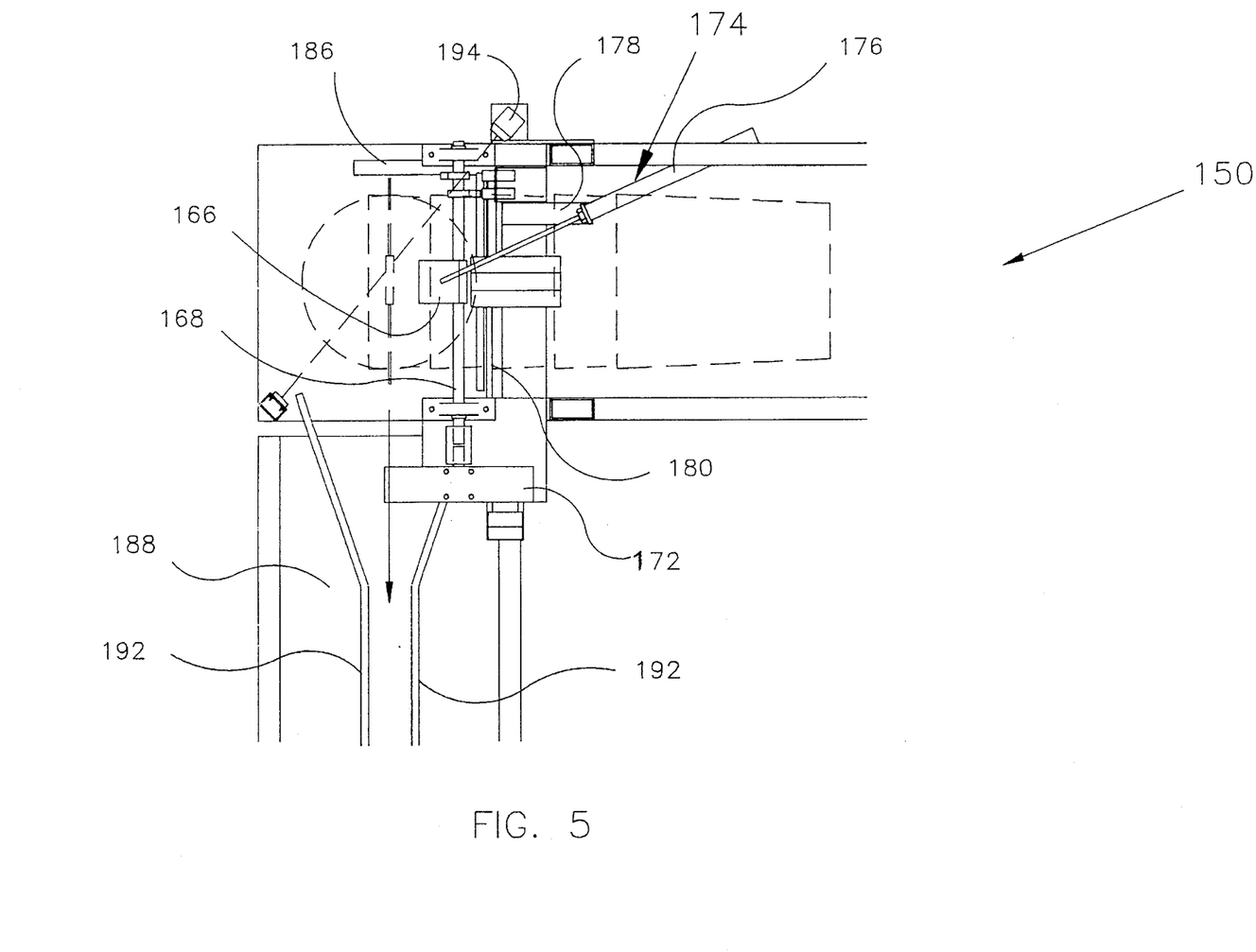
FIG. 5 shows a top view of the orienter of the embodiment of FIG. 4.
Figure 6:
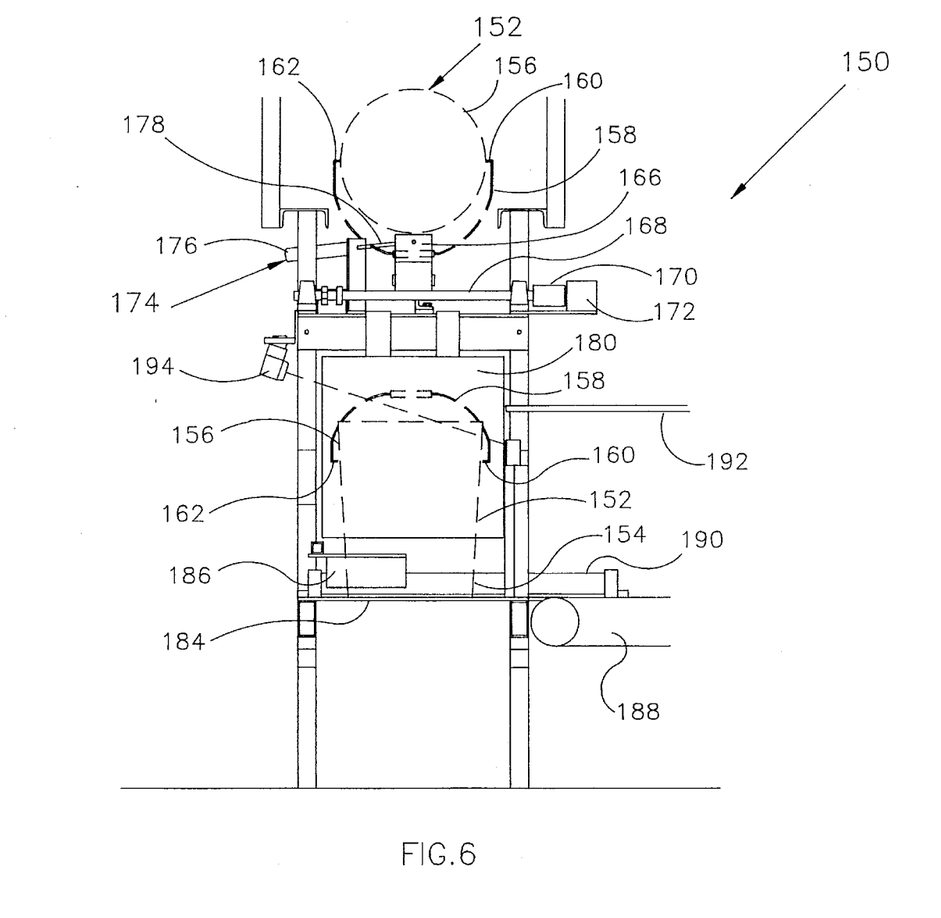
FIG. 6 shows an end view of the orienter of the embodiment shown in FIGS. 4—5.

Referring now to FIGS. 4–6, there is shown a side, top, and end view, respectively, of one embodiment of the handled-receptacle orienter of the present invention. In this embodiment, as illustrated in FIG. 4, orienter 150 is connected to feeder 10, shown in FIGS. 1–3, by connection to feeder frame 18. As is described in greater detail herein, orienter 150 works in conjunction with feeder 10 to orient each receptacle in the same predetermined position with respect to feeder 10 when a receptacle is separated from the remaining receptacles of the stack, or, when pushed forward by pusher bars 108 and 110 if no second receptacle is held in place by side bars 96 and 98.

As seen in FIG. 6, one embodiment of the receptacle used with feeder 10 and orienter 150 of the present invention comprises bucket or pail 152. Bucket 152 is a substantially open container having base 154, upper portion 156 providing access to the open container, and pivotable handle 158 connected to upper portion 156 of bucket 152. In this embodiment, handle 158 is connected to upper portion 156 at first and second handle pivot points 160 and 162, respectively. The longitudinal axis of bucket 152 is defined as extending through the center of base 154 and the center of upper portion 156. The open container and exterior of bucket 152 are shaped to permit stacking of a plurality of buckets 152. When stacked, base 154 of one receptacle is placed into the open container of the adjacent receptacle, with the first, or top, receptacle of the stack being the receptacle having its open container exposed, and the bottom, or last receptacle of the stack having its base exposed. When stacked, all handles 158 are exposed.

As shown in FIG. 4, to use orienter 150, it is expected that the handle of each receptacle in the stack be substantially oriented in the same position with respect to the longitudinal axis of the stack. Specifically, each handle is oriented to be permitted to freely hang downward from the pivot points should the receptacle be suspended with its longitudinal axis lying horizontally.

Returning to FIGS. 4–6, orienter 150 comprises a means for receiving handle 158 of a receptacle in the ready position previously described in association with feeder 10. Specifically, orienter 150 includes handle hook 166 for receiving (hooking) handle 158 of bucket 152. Handle hook 166 is centrally mounted on shaft 168 (see FIGS. 5–6). Shaft 168 is coupled via coupling 170 to rotary actuator 172. Rotation of shaft 168 caused by rotary actuator 172 causes rotation of handle hook 166 about an axis substantially horizontal and perpendicular to the bucket travel path on conveyor system 14 of feeder 10, or, stated in another manner, rotation of handle hook 166 is about a horizontal axis substantially perpendicular to the longitudinal axis of bucket 152 when bucket 152 is in the ready position. During operation, handle hook 166 is rotated between the receptacle release position shown in FIG. 4 in which handle hook 166 resides below shaft 168, and the handle receiving position (designated as 166' in FIG. 4, and shown in FIG. 6) in which handle hook 166 resides above shaft 168.

In the embodiment of FIGS. 4–6, orienter 150 includes handle capture means 174 which comprises pneumatic cylinder 176 having stop rod 178 connected thereto. As shown in FIG. 6, handle capture means 174 is positioned to extend between the space between bucket 152 and handle 158 and to engage handle hook 166. When handle capture means 1174 is retracted, handle capture means 174 does not interfere with handle 158 of bucket 152 when bucket 152 is in the ready position, even if handle 152 swings about pivot points 160 and 162.

Orienter 150 also includes backstop 180 for stopping rotation of bucket 152 as described in further detail herein. Backstop 180 is positioned below shaft 168 and forward of the axis of rotation of handle hook 166 (shaft 168) to permit handle hook 166 to move to its handle-releasing position. Finally, orienter 150 includes platform 184 for receipt of an orienter bucket, and bottom pusher bar 186 for pushing an oriented bucket off platform 184 onto another surface, such as adjoining conveyor system 188 (shown in FIGS. 5–6). Bottom pusher bar 186 is connected to pusher bar pneumatic cylinder 190 such that pusher bar 186 is movable between a home position wherein pusher bar 186 resides on the side of an oriented bucket away from the adjoining surface or machine, and an extended position in which pusher bar 186 resides on the same side of an oriented bucket as is located on adjoining surface or machine.

To maintain the vertical orientation of a handle of a bucket when moved onto adjoining conveyor system 188, conveyor system 188 includes handle guides 192 positioned above the moving surface of conveyor system 188 at a height greater than the height of bucket 152, but less than the maximum height of handle 158.

The various components of orienter 150 are better understood by discussing the operation of orienter 150. When bucket 152 is in the ready position as described in association with feeder 10, and handle 158 hangs downward from pivot points 160 and 162 (as shown in FIG. 6), rod 178 of handle capture means 174 is in its retracted position, handle hook 166 is in its receptacle release position, and bottom pusher bar 186 is in its home position. Pneumatic cylinder 176 is actuated to cause rod 178 of handle capture means 174 to move to its extended position as shown in FIGS. 4–6, and rotation of shaft 168 by rotating actuator 172 causes handle hook 166 to rotate from its receptacle release position to the handle receiving position as shown in FIGS. 4 and 6 in which handle hook 166 contacts rod 178 of hook stop means 174. Rotation of handle hook 166 may occur concurrently with extension of handle capture means 174. When handle capture means 174 reaches its extended position prior to completion of rotation of handle hook 166 as hook stop means 174 serves as a means for stopping and ensuring the proper position of handle hook 166. When hook stop means 174 is extended and handle hook 166 is in its handle receiving position in which handle hook 166 contacts rod 178 of hook stop means 174, a means for receiving handle 158 of bucket 152 is created (see FIG. 4).

At this point, bucket 152 is caused to move forward along its longitudinal axis, as may be accomplished by the combination of fingers 120 and 122 and pusher bars 108 and 110 of feeder 10, for example, and which was described in further detail herein. The forward longitudinal movement of bucket 152 causes handle 158 to be received by handle hook 166. Further movement of bucket 152 in the forward longitudinal direction causes bucket 152 to rotate about handle 158 as illustrated in FIG. 4. It will be appreciated that any moderate variations in the orientation of bucket 152 are, adjusted during rotation of bucket 152 about handle 158.

In the embodiment of FIGS. 4–6, as bucket 152 rotates about its handle, handle hook 166 is simultaneously caused to rotate from its handle receiving position toward its handle releasing position. Rotation of bucket 152 is stopped by backstop 180.

Once bucket 152 rests against backstop 180, handle hook 166 is moved into the handle releasing position to thereby release bucket 152 such that base 154 of bucket 152 rests on platform 184. All buckets 152 oriented in the manner described immediately above will rest on platform 184 in substantially the same radial orientation with respect to the location of handle 158 of bucket 152. Handle 152 also rests against backstop 180 in a substantially upright position as shown in FIG. 4.

The embodiment of orienter 150 shown in FIGS. 4–6 also includes bottom pusher bar 186 serving as a means to slide bucket 152 from platform 184 to another surface, such as adjoining conveyor system 188, which may lead to machines for further processing, such as lidding, filling or labelling of bucket 152. Bottom pusher bar 186 is moved from its home position to its extended position, pushing bucket 152 off platform 184 onto adjoining conveyor system 188. To maintain the proper radial orientation of bucket 152, platform 184 should be comprised of a material permitting easy movement of base 154 over platform 184 by bottom pusher bar 186, but should also not be so slippery as to allow inadvertent movement or rotation of bucket 152 on platform 184. Attached to adjoining conveyor system 188 are handle guides 192 which assist in maintaining the upright position of handle 158 of bucket 152.

It will be appreciated by those of skill in the art that feeder 10 and orienter 150 may be used with a myriad of types, sizes, and shapes of receptacles and is not limited to buckets or pails. Cans, planters, jars, and the like may be used. For automation purposes, it is desired that the receptacle include a substantially open container shaped to permit stacking of the receptacles. However, both feeder 10 and orienter 150 will operate on any container having a base, an upper portion, and a pivotable handle connected to the upper portion of the receptacle.

It will also be appreciated that requiring the substantially same orientation of all receptacles when fed to orienter 150 does not create inconveniences for the user. Generally, when handled receptacles are stacked, a constant radial orientation of the handle with respect to the longitudinal axis of the stack results. Though stacked receptacles are so oriented, denesting systems generally do not ensure maintenance of that orientation, or do not compensate for small differences in the orientation of the handles when stacked. The present invention, however, ensures proper orientation. Small deviations in the orientation of the handle when stacked are accommodated. Further, some flexibility is provided in the orientation when fed to the orienter in the present invention. The positioning of handle capture means. 174 and handle hook 166 are such that the center of handle 158 need not be exactly centered with respect to the longitudinal axis of feeder 10.

It will be further appreciated that the method of orienting and the method of denesting and orienting may be achieved with apparati other than those shown in the embodiment of feeder 10 of FIGS. 1–3 and the embodiment of orienter 150 of FIGS. 4–6. Generally, the orienter of the present invention includes a first support means, such as conveyor system 14 of feeder 10, for supporting either a single receptacle or a stack of receptacles thereon. The orienter further includes a means for retaining the handle of the receptacle, such as handle hook 166, and means for moving the receptacle off the first support means such that the receptacle hangs from the handle retaining means. This moving means includes pusher bars 108 and 110 and fingers 120 and 122 of separator 16 in the embodiment illustrated. Finally, the orienter includes a means for releasing the handle from the handle retaining means, which in the embodiment described herein is accomplished by rotation of handle hook 166, until the receptacle is placed on platform 184 in the predetermined orientation.

It is the use of the handle of the receptacle which bears on the novelty of the present invention. By using the handle, orientation of the receptacle is achieved by placing the receptacle on the first support means, engaging the handle of the receptacle and moving the receptacle toward the engaged handle until the receptacle hangs by its handle, and then releasing the handle of the receptacle such that the receptacle is oriented on a second support means in a predetermined position with respect to the first support means.

For the denesting method, an apparatus is provided to separate the first receptacle from the other receptacles by returning the other receptacles on the support means. In this manner, the same mechanisms used to remove the first receptacle from the stack is the same as the mechanism used to advance the receptacle toward its handle for orientation by the orienter of the present invention.

It will be appreciated that other embodiments may be used which key on the use of the receptacle's handle for orientation and still be within the scope of the present invention, for example, the top receptacle from a stack of vertically disposed receptacles could be pulled by its handle away from the stack and then moved to a second platform. Likewise, the handle of a bottom receptacle of a stack of vertically disposed receptacles could be engaged and the bottom receptacle moved in the direction of the engaged handle to get the bottom receptacle to hang by its handle and then be released into a predetermined position with respect to the apparatus.

As previously suggested, feeder 10 may be used in conjunction with orienter 150 of the present invention. The use of both apparati results in an efficient receptacle denesting and orienting machine. As many as 25 buckets per minute may be denested and oriented by such a machine. To achieve this desirable result, the timing of the various moving subsystems of feeder 10 and orienter 150 should be coordinated and optimized. For feeder 10 to quickly denest each receptacle from a stack of receptacles, stop plate 92 extends downward at the time that fingers 120 and 122 release the receptacle which has just been denested (separated) from the remainder of the stack. Also, as soon as fingers 120 and 122 and pusher bars 108 and 110 begin to retract, another receptacle is permitted to be moved forward toward stop plate 92 by conveyor system 14 as side bars 96 and 98 are retracted.

With regard to coordination of the operation of feeder 10 and orienter 150, as already described, handle hook 166 is moved into the handle receiving position just before a receptacle is moved from the ready position by the combination of fingers 120 and 122 and pusher bars 108 and 110. Also, as bottom pusher bar 186 of orienter 150 is pushing a receptacle onto adjoining conveyor system 188, pusher bars 108 and 110 are in the process of separating another receptacle by pushing it forward from the ready position. Further, bottom pusher bar 186 of orienter 150 returns to its home position when handle hook 166 rotates downward, i.e, while a receptacle is being rotated by the rotation of handle hook 166.

It will be appreciated by those of skill in the art that the coordination of the movements of stack inverter 12, conveyor system 14 and separator 16 of feeder 10 and the movements of orienter 150 may be performed by an electronic control system comprised of components well known in the art. Sensors, such as photoelectric sensors 82 and 84 of conveyor system 14, or photoelectric sensor 194 of orienter 150 (detecting the presence of a receptacle in the ready position) may be used to monitor the position of receptacles in the machine. Further, proximity switches, such proximity switches 60 and 62 of stack inverter 12, and proximity switches 95, 104 and 106 of denester 16 may be strategically placed with respect to the moving parts, such as stop plate 92, side bars 96 and 98, fingers 120 and 122, pusher bars 108 and 110, hook stop means 174, handle hook 166, and bottom pusher bar, 186 to indicate that the respective part has moved to the appropriate positions. Such an electronic control system may also control the actuation of the pneumatic cylinders and motors used in feeder 10 and orienter 150. For such an electronic control, accommodation may also be made for interruptions or failures in the operation of the machine.

It will also be appreciated that the apparatus and method for orienting handled receptacles according to the present invention is independent of the shape of the receptacle. Though round buckets are shown in the Figures, the receptacles may be square, rectangular, octagonal, hexagonal, etc. in shape. Also, the handle of the receptacle need not be located proximate the upper lip, specifically, but rather must be pivotally connected at a point to permit rotation of the receptacle about the handle in the direction away from the support means or denester. Further, though the receptacles shown are tapered, having a wider upper lip than base, such a tapered receptacle is not required for the orienter of the present invention. Finally, there is no requirement that the receptacles include protrusions onto which the handle is connected.

It will be further appreciated that the orienter of the present invention may be used in conjunction with an all purpose adjoining conveyor system for conveyance of orienting buckets, thus eliminating the need for a special system designed to accommodate the size and shape of buckets. Further, the orienter could provide oriented receptacles directly onto another machine, such as a filling machine, which has a conveyor :system serving it.

It will also be appreciated that the denester and orienter of the present invention as illustrated herein delivers oriented buckets to a conveyor system having a conveyor path that is perpendicular to the denester/orienter machine and other orientations of the conveyor system are possible. Thus, the present invention provides greater flexibility in the orientation of the conveyor system than prior art systems.

It will be still further appreciated that the orienter and denester of the present invention are relatively inexpensive to manufacture, repair and maintain. Though many mechanisms are required for the many movements necessary for the denesting and orienting processes, the orienter and denester of the present invention utilizes inexpensive, reliable, low maintenance components, such as pneumatic cylinders, to accomplish those movements.

It will be yet further appreciated that the orienter of the present invention may be used to orient unstacked receptacles. Hence, the receptacles provided to the orienter do not have to be substantially open containers. The receptacles may in fact be completely closed, so long as the receptacle has a pivotable handle attached thereto.

It will also be appreciated that no stress is placed on the receptacle by orienting forces after the receptacle is oriented. Prior art systems rotated the receptacle by use of moving conveyor belts or a rotatable disk which continue to move, to apply orienting forces, to the receptacle after it is oriented. The present invention eliminates such stresses which could damage the receptacles or which could mark or scratch the portion of the receptacle contacting the moving orienting surface.

It will further be appreciated that the denester/orienter of the present invention does not scratch the receptacle surface, nor does it deform or disfigure the receptacle. Thus, preprinted receptacles are :not rendered as scrap by the denesting and orienting procedures, assisting in minimizing the costs associated with processing of preprinted receptacles.

What is claimed is:

1. An apparatus for orienting a receptacle, the receptacle having a base, an upper portion and a pivotable handle attached to the upper portion thereof such that the receptacles may hang from the pivotable handle, the apparatus comprising:

first means for supporting the receptacle;

means for retaining the pivotable handle of the receptacle;

means for moving the receptacle off the first support means such that the receptacle hangs from the handle retaining means; and means for releasing the handle from the handle retaining means such that the receptacle is oriented in a predetermined position with respect to the apparatus when released.

2. The apparatus of claim 1, wherein the first support means comprises a conveyor system for conveying a receptacle.

3. The apparatus of claim 1 wherein the handle retaining means comprises a hook shaped for receipt of the pivotable handle when the receptacle to is moved by the receptacle moving means.

4. The apparatus of claim 3, wherein the handle releasing means comprises a means for rotating the hook until the hook releases the handle.

5. The apparatus of claim 3, wherein the receptacle further comprises a longitudinal axis extending through the base and upper portion thereof, and wherein the first support means comprises a horizontal axis, such that the receptacle is supported by the first support means with the longitudinal axis of the receptacle substantially parallel to the horizontal axis of the first support means and such that the means for moving the receptacle moves the receptacle along the horizontal axis of the first support means in a direction away from the rust support means to permit the forces of gravity to cause rotation of the receptacle about its handle, the apparatus further comprising;

means for stopping rotation of the receptacle when the receptacle reaches a substantially upright position.

6. The apparatus of claim 1, further comprising:

a second support means for receipt of the receptacle when released by the handle releasing means.

7. The apparatus of claim 6 further comprising:

means for moving a receptacle supported by the second support means onto a conveyor means adjacent the second support means..

8. The apparatus of claim 7, wherein the means for releasing the handle of the receptacle releases the handle in an upright position with at least a portion of the handle positioned above the upper portion of the receptacle, the apparatus further comprising:

handle guide means for maintaining the upright position of the handle during movement of the receptacle from the second support: means onto an adjacent conveyor means.

9. An apparatus for denesting and orienting a plurality of stacked receptacles including a first receptacle, each receptacle comprising a substantially open container having a base, an upper portion through which access is provided to the open container, and a pivotable handle connected to the upper portion thereof such that the receptacle may hang from the pivotable handle, the plurality of receptacles stacked by placement of the base of one receptacle into the open container of the adjacent receptacle, the first receptacle comprising the receptacle having an exposed open container, the apparatus comprising:

a first means for supporting the plurality of receptacles;

means for retaining the pivotable handle of the first receptacle;

means for retaining all other receptacles except the first receptacle on the first support means;

means for moving the first receptacle away from the other receptacles to thereby separate the first receptacle from the other receptacles and from the first support means such that the first receptacle hangs from the handle retaining means; and means for releasing the handle of the first receptacle from the handle retaining means such that the first receptacle is oriented on a second support means in a predetermined position with respect to the apparatus.

10. The apparatus of claim 9, wherein the first support means comprises a conveyor system having a horizontal axis along which stacked receptacles are conveyed by the conveyor system.

11. The apparatus of claim 10, wherein each receptacle includes a longitudinal axis defined as extending through the base and upper portion thereof, such that stacked receptacles are supported by the first support means such that the longitudinal axis of the receptacle is substantially parallel with the horizontal axis of the conveyor system, and wherein the means for retaining all other receptacles except the first receptacle comprises:

first and second side bars, each movable between an extended position and a retracted position, each side bar disposed on opposing sides of the horizontal axis of the conveyor system such that when the first and second side bars are moved to their extended position the first and second side bars engage the upper portion of the receptacle adjacent the first receptacle.

12. The apparatus of claim 9, wherein the first supporting means includes a horizontal axis, and wherein the means for moving the first receptacle away from the other receptacles to thereby separate the first receptacle from the other receptacles comprises:

means for engaging the upper portion of the first receptacle; and means for pushing the first receptacle when engaged by the upper portion engaging means along the horizontal axis of the first support means in a direction away from the other receptacles.

13. The apparatus of claim 12, wherein the first supporting means includes a horizontal axis, and wherein the pushing means comprises:

first and second pusher bars each movable between a retracted position and an extended position, each pusher bar having a longitudinal axis substantially parallel to the horizontal axis of the first support means such that movement of the pusher bars from their retracted to extended positions pushes the first receptacle away from the other receptacles.

14. The apparatus of claim 12, wherein the means for engaging the upper portion of the first receptacle comprises:

first and second fingers, the first finger disposed on the first pusher bar, the second finger disposed on the second pusher bar, each pusher bar movable between a retracted position in which the finger does not engage the upper portion of the first receptacle and an extended position in which the finger engages the upper portion of the first receptacle.

15. A method for orienting a receptacle, the receptacle having a base, an upper portion, and a pivotable handle connected to the upper portion such that the receptacle may hang from the pivotable handle, the method comprising the steps of:

providing a first support means for supporting the receptacle, means for retaining the pivotable handle of the receptacle, means for moving the receptacle off the first support means, and means for releasing the handle from the handle retaining means;

placing the receptacle on the first support means;

engaging the handle of the receptacle with the handle retaining means;

moving the receptacle with the moving means in a direction toward the engaged handle until the receptacle hangs by the handle; and releasing the handle of the receptacle from the handle retaining means with the handle releasing means such that the receptacle is oriented in a predetermined position with respect to the first support mean when released.

16. The method of claim 15, further comprising, prior to the step of engaging the handle of the receptacle, the step of providing a second support means and providing a conveying means adjacent the second support means, the method further comprising the step of:

moving the first receptacle from the second support means onto the adjacent conveyor means.

17. The method of claim 15, wherein the receptacle further comprises a longitudinal axis defined as extending through the base and upper portion thereof, wherein the receptacle is placed on the first support means such that the longitudinal axis of the receptacle is substantially horizontal, and wherein the step of moving the receptacle in a direction toward the engaged handle permits the force of gravity to cause the receptacle to rotate with respect to the handle, the method further comprising, prior to the step of releasing the handle of the receptacle, the step of:

stopping rotation of the receptacle when the receptacle reaches a substantially upright position, such that when the receptacle is released, the handle is in an upright position with at least a portion of the handle positioned above the upper portion of the receptacle.

18. A method for orienting and denesting a plurality of stacked receptacles, comprising the steps of:

providing a stack of receptacles including a first receptacle, each receptacle comprising a substantially open container having a base, an upper portion through which access is provided to the open container, and a pivotable handle connected to the upper portion such that the receptacle may hang from the pivotable handle, the receptacles stacked by placement of the base of one receptacle into the open container of the adjacent receptacle, the first receptacle comprising the receptacle having an exposed open container;

providing a first means for supporting the stacked receptacles, means for retaining the pivotable handle of the first receptacle, means for retaining all other receptacles except the first receptacle, means for moving the first receptacle, and means for releasing the handle of the first receptacle from the handle retaining means;

placing the stacked receptacles on the first support means;

retaining all other receptacles except the first receptacle on the first support means with the retaining means for all other receptacles;

engaging the handle of the first receptacle with the handle retaining means;

moving the first receptacle with the moving means in a direction toward the engaged handle and away from the other receptacles until the first receptacle is separated from the other receptacles and the first support means and the first receptacle hangs by the handle of the first receptacle; and releasing the handle of the first receptacle from the handle retaining means with the handle releasing means onto a second support means such that the first receptacle is oriented in a predetermined position with respect to the first support means.

* * * * *